(No Model.) 5 Sheets—Sheet 1.
M. NIRDLINGER.
MACHINE FOR MANUFACTURING ARTIFICIAL FUEL.
No. 533,488. Patented Feb. 5, 1895.
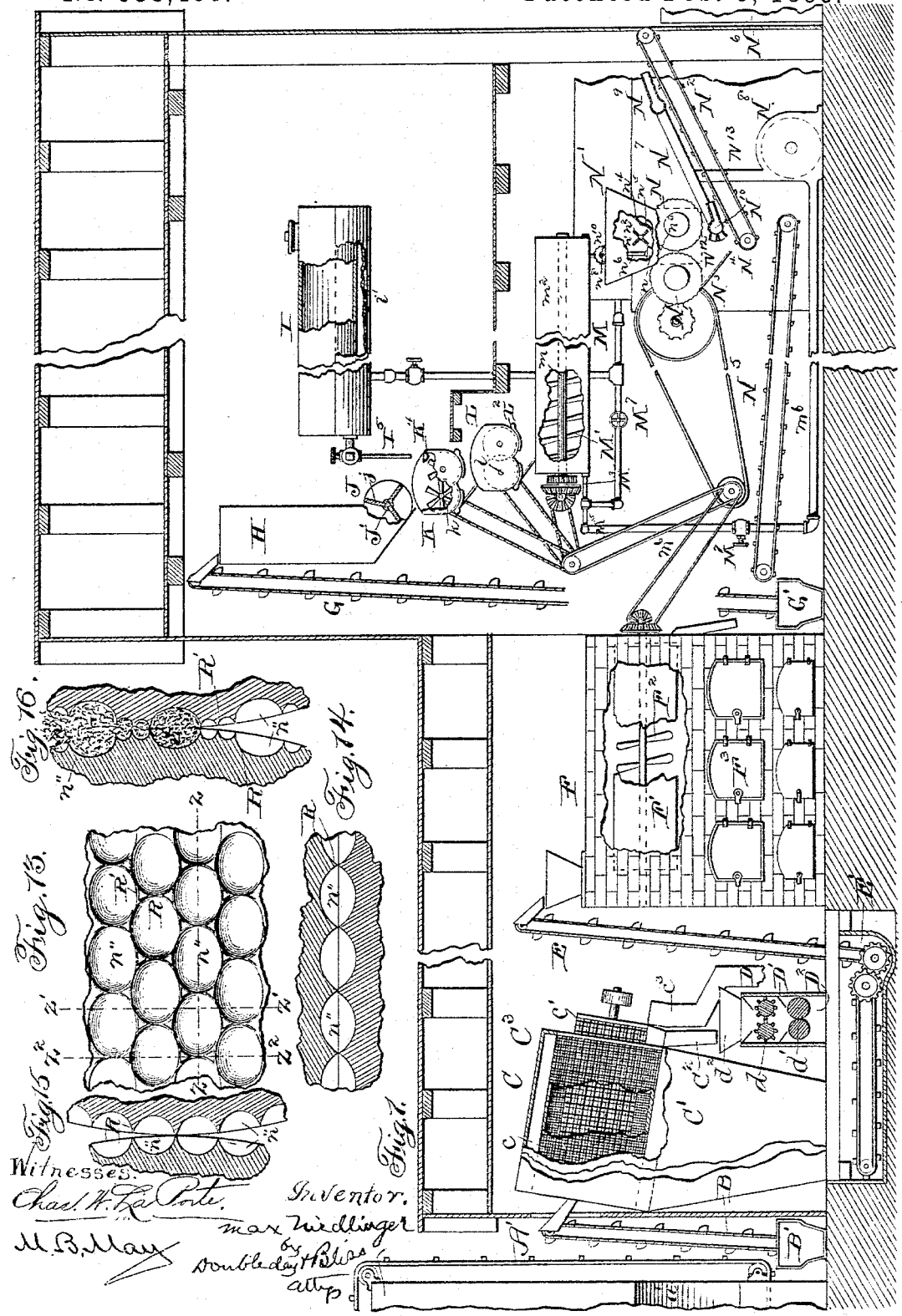

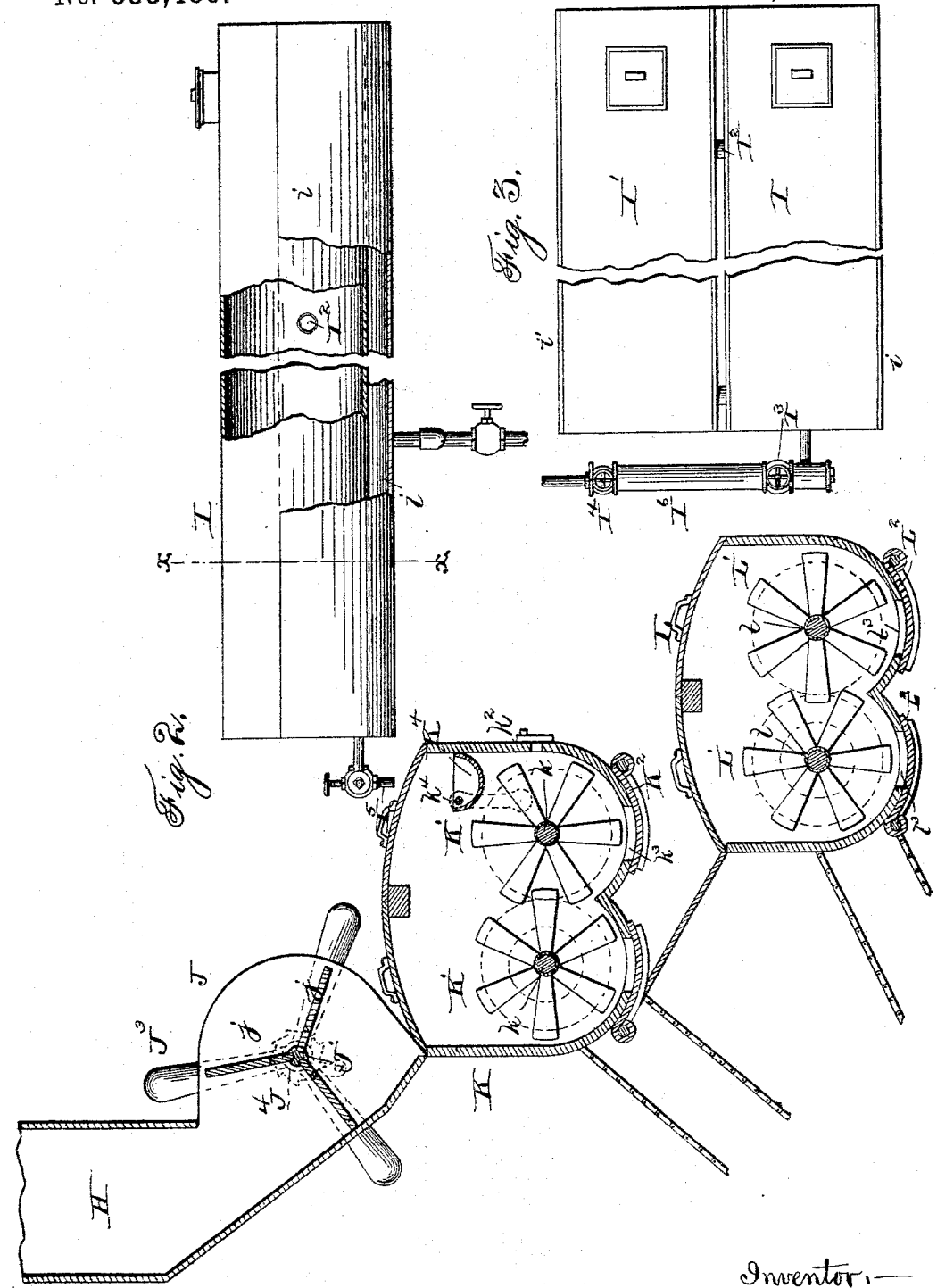

(No Model.) 5 Sheets—Sheet 3.
M. NIRDLINGER.
MACHINE FOR MANUFACTURING ARTIFICIAL FUEL.
No. 533,488. Patented Feb. 5, 1895.
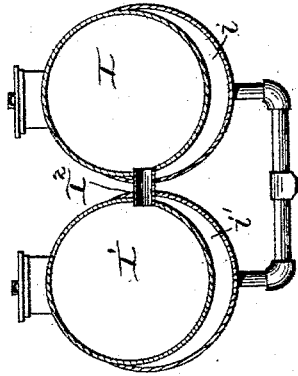
Fig. 4.
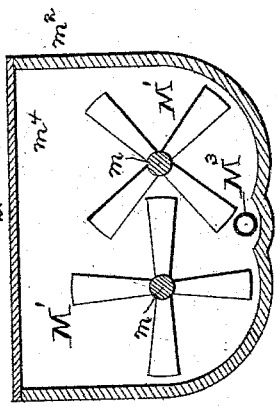
Fig. 7.
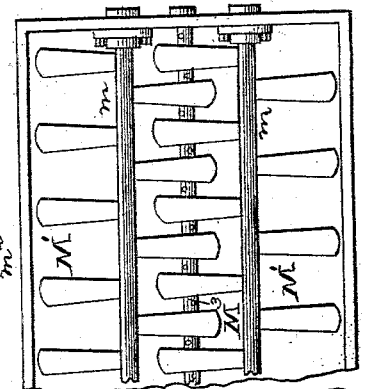
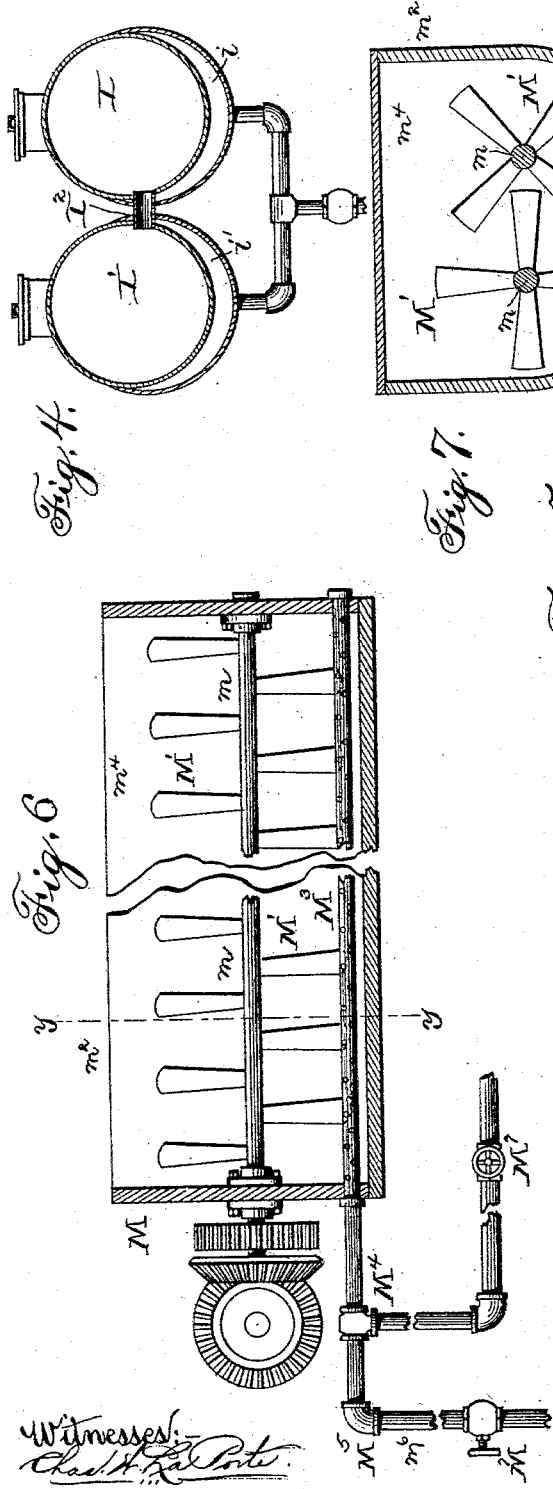
Fig. 5.
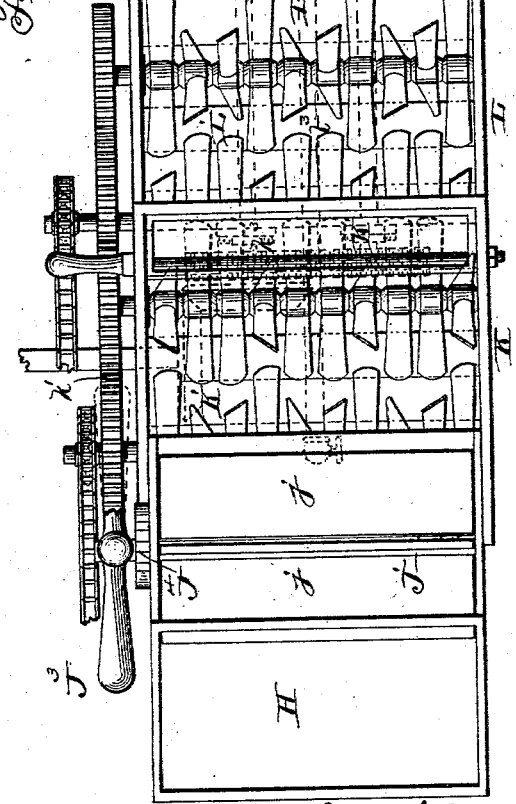
Fig. 6.
Witnesses:
Chas. H. La Porte
M. B. May
Inventor:—
Max Nirdlinger
by
Doubleday & Bliss attys (No Model.) 5 Sheets—Sheet 4.
M. NIRDLINGER.
MACHINE FOR MANUFACTURING ARTIFICIAL FUEL.
No. 533,488. Patented Feb. 5, 1895.
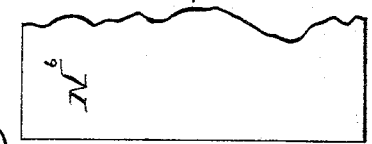
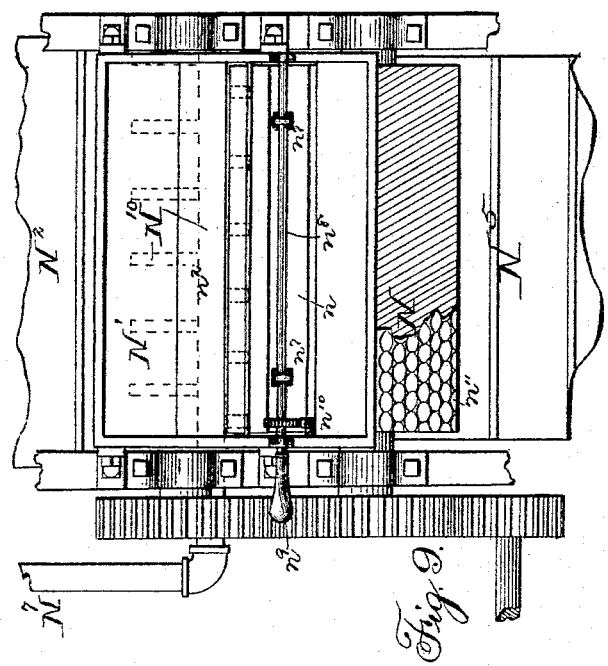
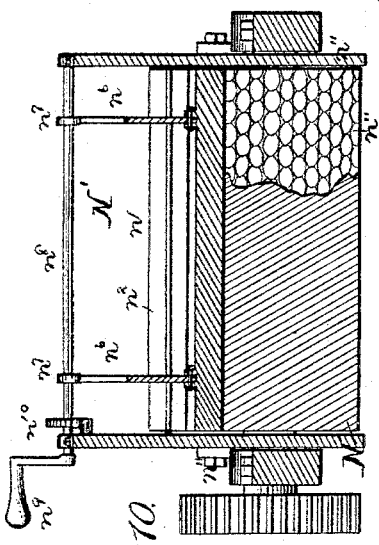
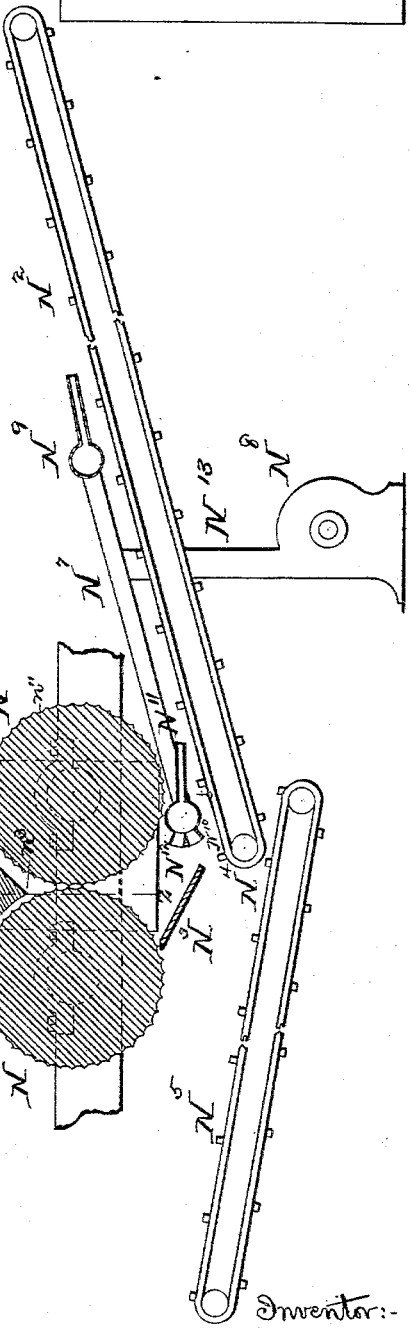

(No Model.) 5 Sheets—Sheet 5.
M. NIRDLINGER.
MACHINE FOR MANUFACTURING ARTIFICIAL FUEL.
No. 533,488. Patented Feb. 5, 1895.
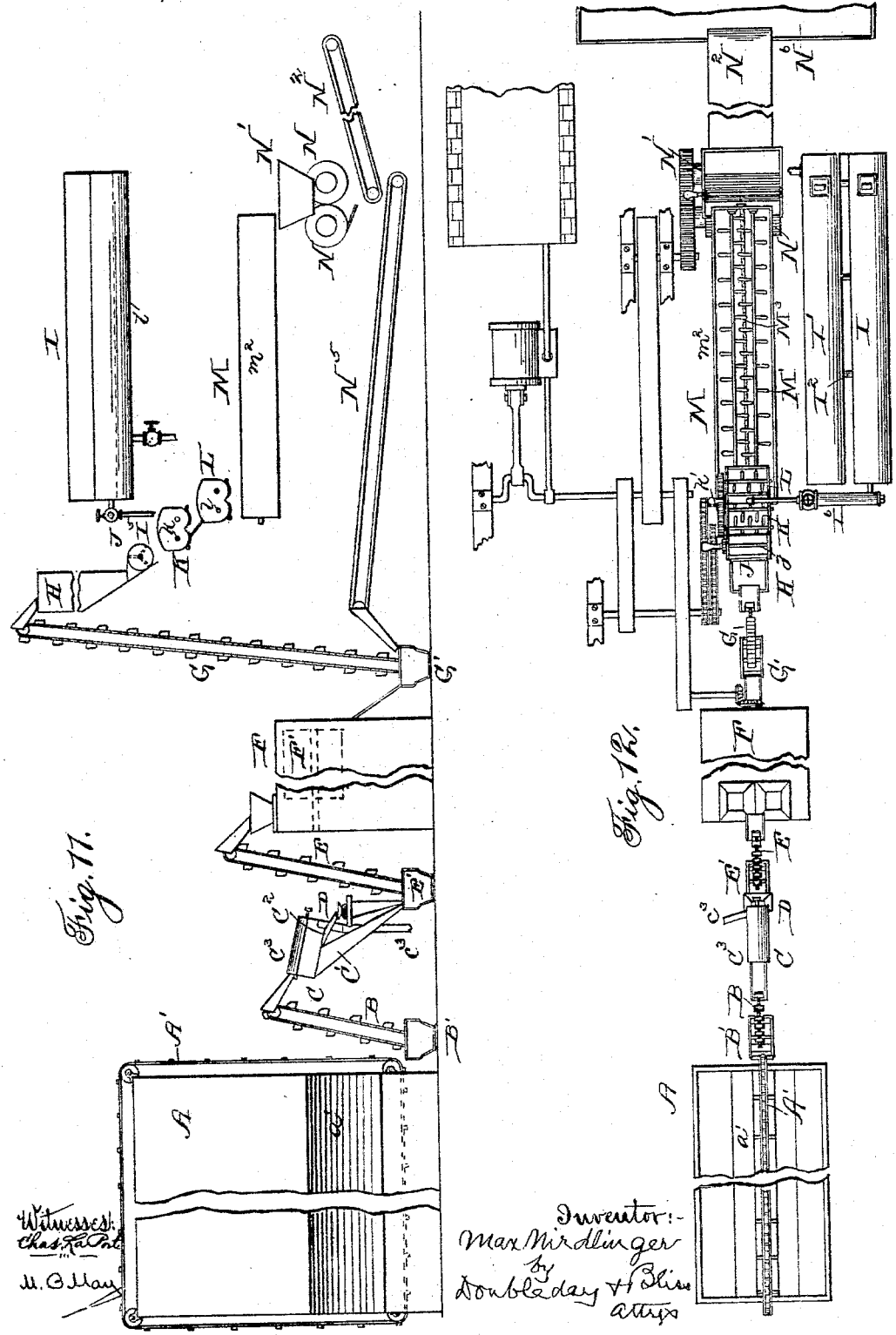

United States Patent Office.

MAX NIRDLINGER, OF MILWAUKEE, WISCONSIN, ASSIGNOR TO THE FUEL PATENTS COMPANY, OF NEW JERSEY.

MACHINE FOR MANUFACTURING ARTIFICIAL FUEL.

SPECIFICATION forming part of Letters Patent No. 533,488, dated February 5, 1895.

Application filed November 9, 1893. Serial No. 480,476. (No model.)

*To all whom it may concern:*

Be it known that I, MAX NIRDLINGER, a citizen of the United States, residing at Milwaukee, in the county of Milwaukee and State of Wisconsin, have invented certain new and useful Improvements in Machines for the Manufacture of Artificial Fuel, of which the following is a specification, reference being had therein to the accompanying drawings.

This invention relates to improvements in apparatus for manufacturing artificial fuel and for treating the ingredients thereof prior to bringing them together in such manufacture.

Figure 1 is a side elevation of an apparatus for this purpose, shown more or less conventionally in some respects. Fig. 2 is a view partly in side elevation, and partly in vertical section showing the mechanism for preparing the binder material, that for measuring the culm, and the upper mixers. Fig. 3 is a partial plan of the mechanism for preparing the binder. Fig. 4 is a cross-section on the line $x$—$x$ of Fig. 2. Fig. 5 is a plan view of the upper mixers and of the tempering mixer. Fig. 6 is a longitudinal section of the tempering mixer. Fig. 7 is a cross-section on the line $y$—$y$ of Fig. 6. Fig. 8 is a vertical section of the compressing apparatus. Fig. 9 is a plan view of the compressing mechanism. Fig. 10 is a vertical section on the lines $z$—$z$ of Fig. 8. Fig. 11 is a side view of a conventional character showing the whole of an apparatus substantially similar to that in the other figures, there being slight modifications, as in the arrangement of the screen, the reducing apparatus, &c. Fig. 12 is a plan view of parts illustrated in Fig. 1, it showing also the general features of the arrangement in Fig. 1, when seen in plan. Figs. 13 to 16 show on a large scale the relations and shapes of the compressing cavities.

One of the purposes of the present invention is to provide an apparatus by means of which the process can be carried on rapidly and economically not only with respect to it considered as a whole, but when considering each of the numerous steps in the treatment of the several materials.

A represents a relatively large storing bin or apartment for initially receiving and holding the coal, culm or slack or a mixture of the same. At the bottom the walls converge as at $a$ $a'$ so as to direct the material toward a longitudinally arranged conveyer A' adapted to carry the coal or culm at the desired speed to the boot B' of the elevator B. The latter device delivers the material to a screening mechanism indicated by C. This may be of any of several sorts suitable for the purpose, the screen proper being either a flat shaking sieve or a rotary screen. It may be provided with wire or other mesh adapted to permit the finer particles to escape through the screen from end to end of the latter, the particles or lumps larger than the meshes escaping in a common mass through the discharge end; or the screen may be divided into two or more sections with meshes of varying sizes so as to effect a subdivision into several masses.

As shown in the drawings, the screen is formed with two concentric cylindrical sieves $c$ $c'$, one having a smaller mesh than the other. The outer smaller mesh is of such nature that the particles that can pass through it to the trunk or chute C' are ready without further reduction for use in the manufacture of fuel. The particles of the next larger size, which escape through the inner coarser mesh but are held by the outer one, are carried through the trunk or chute $C^2$ to the reducing mechanism at D. The still larger particles or lumps of coal are delivered through the discharge end of the screen, and are deflected or guided to a suitable receptacle or place of deposit as at $c^3$; these particles or lumps being of such size as to be capable of use as fuel, and as such may be put upon the market or may be employed for firing the engine used for operating the local mechanism.

I have shown the screen as being incased by a housing as illustrated at $C^3$, so that the dusty parts will not be carried off by the air.

Instead of dividing the total mass into three masses in the way just described the screen may consist of a single cylinder with sections of different sized mesh from which the different parts of the mass may be taken to the desired points above described by the chutes shown in Fig. 11.

The reducing mechanism D consists in the breakers $d$ which break up lumps or blocks and insure that the mass passing between them shall be sufficiently fine to be properly acted upon by the crushing rolls $d'$. These are mounted in a framework shown at D' provided with a hopper $d^2$. The crushed or ground mass is taken through duct $D^2$ and delivered into the receptacle or boot E' which receives also the fine material from the screen C. The elevator E carries the reduced culm up to and delivers it to the drying apparatus indicated by F. The latter comprises one or more cylinders F' mounted in a heating chamber, agitators and conveyers $F^2$ mounted longitudinally in said cylinders, and fire chambers at $F^3$. The parts of the drying apparatus are so arranged as to impart a relatively high heat to the material, so as to vaporize the moisture which it contains, and the desiccating is rapidly completed.

The fire chambers and flues are shown in Fig. 1 as being arranged transversely of the cylinders F'; but they may be arranged longitudinally thereof if preferred.

I also combine with the drying mechanism devices that deliver large quantities of properly treated air which acts to assist in a rapid drying, the air being passed through heating mechanism and being forced by a fan through suitable ducts into and out from the cylinders.

The dried material is received in a boot at G' of the elevator G. This elevator carries the material to the receptacle H, where it is temporarily stored until it is desired to withdraw it in measured quantities to introduce into the mixing apparatus.

I have found that the steps which I have been describing are of great importance and advantage in the manufacture of fuels of this class, and that the resulting material is superior to that which is made from culm or slack which has not been subjected to them. The screening of the fine dusty parts from the coarser particles and the reducing by crushing or grinding mechanism of the latter to a pulverulent, dust-like consistency provides a stock which is uniform throughout so that a perfectly homogeneous mixture can be obtained when the binding material is introduced, and so that the pressure of the block or egg forming mechanism shall be uniformly distributed. Then the desiccating action is of great importance, as the presence of moisture in the culm or slack seriously interferes with the proper adhesion of the binding material to the surfaces of the coal particles; whereas when the moisture has been thoroughly removed, so that the pores or interstices are open, the binding material can exert its action much more forcibly.

The binding material is a composition comprising to some extent pitch or equivalent vegetable or mineral body. It is initially elevated to a receptacle in that part of the building which holds the melting or liquefying mechanism. The latter consists mainly of two sheet iron cylinders, or vats I I'. These are surrounded by jacketing cylinders or casings $i\ i'$ which are steam-tight; and to the intervening chambers steam can be admitted from any suitable source. The pitch and other elements of the binding compound are first introduced into the cylinder or vat I, and here they commence to melt or liquefy. The melted or fluid part of the mass, after being heated, rises to and flows through the pipes or ducts $I^2$ which connect the cylinders or vats I I'. The melted or fluid materials pass through the ducts $I^2$ into the cylinder I which is also kept at the desired high heat and from which it can be withdrawn as it may be wanted.

Heretofore it has been customary to soften and melt the pitch and other ingredients of the fuel compounds in a vat or tank from which the fluid portion was drawn immediately to the mixing apparatus; but I have found that much inconvenience is incident to an apparatus of that sort, and that much time is consumed in using it. When a charge of the pitch has been introduced, it takes a considerable period of time to liquefy it suitably, and the rest of the apparatus must be stopped until this end is attained. Again, the melted portions tend to rise to the top, and the more solid parts to sink to the bottom, so that there is difficulty in drawing off from a relatively low level material liquefied to the extent desired. To overcome these difficulties I have introduced the supplemental or receiving vat or tank I, capable of maintaining the fluidity of the material after it has been liquefied in the primary heating tank. By mechanism of this sort, there is always ready a sufficient amount of fluid binder for instant withdrawal, and there need be no stoppage of the apparatus for obtaining or preparing a sufficient quantity of binding material of the right consistency.

With the parts last described I combine a measuring mechanism whereby exactly measured quantities of the fluid binder can be taken off at intervals. Any form of measure can be used, one of the simple character illustrated being preferred, it consisting mainly of a pipe $I^6$, with two valves or stop cocks $I^3\ I^4$. When the valve $I^3$ is opened, the chamber or duct between it and the valve $I^4$ will be filled. When it is desired to withdraw a charge of binder, the valve $I^3$ is closed, and the valve $I^4$ is opened, which permits the desired amount to escape at the nozzle $I^5$. I provide also (returning now to the means for treating and delivering the solid elements, the culm, slack, &c.) an accurate and intermittingly acting measuring mechanism for the solid parts of the fuel which are to be mixed with the binder.

The hopper or receptacle H above described communicates with a measuring device at J, that is shown as consisting of a series of compartments formed by walls or plates $j\ j'$ secured to a shaft J' provided with one or more levers $J^3$ and holding devices $J^4$, which consist, in this case, merely of a ratchet and pawl. Preferably there are three of the plates, and therefore three compartments, and the parts are so constructed and arranged that the shaft J' shall rotate part way for delivering each charge of material. In practice, the compartments of the measure hold respectively from five hundred to one thousand pounds each, and at each discharge there is delivered the same amount of material. The measuring device J, operates as a cut-off to intercept the pulverized material, and prevent its flowing continuously into the mixing mechanism and the cock at $I^4$ performs a similar function for the liquid binder. The slack or culm thus measured and delivered passes into the first mixing device K. With respect to its details, this may be of any suitable sort, but I prefer one having the features shown, it being constructed with two sets of mixers $K'$ $K'$, these being blades or paddles secured to shafts $k$ $k$ which are geared together at $k'$. The mixing devices are mounted in a chamber whose side walls are indicated by $k^2$, and in the bottom of which there are one or more apertures $k^3$ having doors $K^2$. $K^4$ is a measure or receptacle of the nature of a swinging trough hinged at $k^4$ to the mixer walls, and so situated as to receive the successive charges of liquid binder material from the nozzle $I^5$. When it is rocked upon its hinge or pivots, it delivers this material toward the central part of the mixing box, and uniformly from end to end. This receptacle may be used as the initial measuring device, and in fact it is so used in actual practice. It holds about eight gallons of binder, or whatever amount is needed, for the charge of pulverized coal, and the binder may be fed into it without first measuring it. In this case the stop cock at $I^3$ is left continuously open, while that at $I^4$ is used to cut off or regulate the flow of the liquid. After a charge of the slack or culm and a charge of the liquid binder have been introduced into this mixer K, the particles of the two sorts of ingredients are brought into intimate contact with each other by the action of the stirring and agitating blades or paddles which lift them again and again and turn them over and over.

It is necessary that the mixing receptacle should be closed during the operation of the agitating blades, as the latter move more or less rapidly and tend to throw the material upward; and again the fumes from the heated binder are obnoxious. Hence, the top entrance to the receptacle is tightly closed by covers after each charge has been measured and introduced. At the same time it is necessary that there should be inspection of the contents in order that the operator may ascertain exactly the time at which the charge should be delivered to the second mixer or to the conveyer, which carries it to the rolls. The length of time of treatment differs with the differing conditions of the material, the temperature, the atmosphere, &c. To permit such access and inspection, a passage-way is formed in the side of the mixing receptacle independently of that at the top and the doorways in the bottom, as illustrated in Fig. 2. After the charge of material has been subjected to this action in the mixer K, a sufficient length of time, the doors at $K^2$ are opened, and the material is guided downward into a second mixer at L which is constructed with agitating or stirring devices at $L'$, shafts $l$, openings $l^3$, and doors $L^2$ substantially similar to the corresponding parts in the mechanism indicated by K. The doors or removable bottoms which extend the whole length of the mixer may be secured in place by any of the ordinary fastening devices, and are opened after the charge has been mixed for a short period of time, say from one to two minutes (according to the material being treated) so that instantaneously the whole charge is dumped from the mixer K into the mixer L below. This supplemental mixing mechanism L is one of the most important parts of the present apparatus, as by means of it I am enabled to carry on the process practically continuously, and at the same time treat successive quantities in volumes small enough to have them of exactly the right consistency and keep them at the desirable temperature. Heretofore a single mixer has been used, and the material has been retained therein for several minutes. The result was that the apparatus was practically stopped for a period of time equal to that occupied by the mixing stage. By the use of the present mechanism I am enabled to reduce the time during which the material remains in the mixer at K to one minute, at the end of which it is emptied and another charge is received, this being because of the possibility to continue the mixing operation in the supplemental mixer at L where it remains for another minute. From the mixer L, the material is received into the final, tempering and mixing device indicated as a whole by M. The parts at K and L are parallel to each other, but those at M are transversely situated. The latter is somewhat similar to the mixers at K and L except that it is much longer in order to allow for the proper tempering of the material, that is to say, raising or lowering its temperature before it reaches the block- or egg-forming mechanism. A long experience in this line of work has shown me that the conditions upon which depend satisfactory results vary greatly both with respect to the materials which are being used, and with respect to meteorological conditions such as the general temperature, the moisture in the atmosphere, &c. When these conditions are of one sort, the material must be raised in temperature relative to that in which it is received from the mixers K, L, and under other conditions it must be lowered. This mechanism at M comprises one or more shafts $m$ with blades or paddles $M'$, they being mounted in the trough whose walls are indicated by $m^2$.

$M^3$ is a duct running along this trough from end to end and provided with numerous apertures or orifices. At $M^4$ this duct is connected to a hot air or steam duct or pipe by means of which such air or steam can be admitted to and distributed through the mass of material in the trough $m^4$. At $M^5$, the duct is connected to a cold air pipe or trunk $m^6$ through which air can be forced by a fan or equivalent mechanism. The operator can readily alter or modify the contents of the duct $M^3$ by means of stop-cocks or valves as at $M^7$ and thereby regulate the temperature and other conditions of the mass of material in the tempering trough. Said material after being properly tempered and otherwise treated in the trough M, is delivered into the hopper $N'$ of the compressing rolls N.

It will be understood that the mixing mechanism as a whole, is so constructed and arranged that the process of mingling the binding material and the granular or reduced coal shall be kept up throughout the whole course of the action of the mixing mechanism, the result being that all of the particles of coal are brought into contact with the binding material before the passage of the mixed material to the rolls. That part of the mixing mechanism which acts as a tempering device, viz: the part at M not only acts to thus assist in effecting a thorough mingling of the two materials, but also can be utilized to vary the temperature of the mass if necessary, according to the conditions at the time. It will also be seen that while the coal and binder are initially received intermittingly in predetermined charges, they are delivered from the mixing mechanism to the rolls, substantially continuously, this being accomplished by elongating the conveying or agitating devices at the parts at M with the result of producing a substantially uniform stream; that is to say, by breaking up the charges received from the parts K and L and spreading them out in a continuous flow.

The initial delivery of the materials in charges and retaining them in a preliminary mixer, as at K for the proper period, say one minute, are of great advantage as the charge of binder can be mingled with the proper proportion of granular or reduced coal to better effect than when the attempt is made to deliver them as continuous streams, as the tendency in the latter case is to form lumps or areas with greater amounts of the binder and areas with lesser amounts.

The rolls are very strong steel cylinders having cavities or depressions $n^{11}$ formed in their exterior surfaces, each cavity of one roller registering exactly with a cavity in the opposing one, and the two together being adapted to mold a more or less egg-shaped block. These rolls have exceedingly heavy, strong journals mounted in a firm support so that the rolls shall be able to withstand a very powerful pressure.

In order to regulate exactly the feed of the material to the tangent parts of the rolls, I place an adjustable cut-off $n$ at a place near the bottom of hopper $N'$, and somewhat nearer one of the rolls N than the other. Then I mount an agitating and feeding device $n'$ across the hopper, it being constructed with stirring and advancing blades $n^2$ adapted to engage with the material and more or less push it through the throat-way $n^3$ between the cut-off $n$ and the rolls. To make this stirring and feeding device $n'$ more efficient, I employ a wall or partition $n^4$ having a concave portion $n^5$ approximately concentric with the revolving feeder $n'$. The cut-off $n$ can be adjusted as it is suspended by links $n^6$ from eccentrics $n^7$ secured to shaft $n^8$, the latter having a crank $n^9$ and ratchet or other lock $n^{10}$. If because of varying conditions in the material, or for other reasons, the size of the throat $n^3$ has to be changed, the operator can accomplish it accurately and readily by the devices described.

The material which is fed to the tangent parts of the rolls N N is received by and forced into the cavities $n^{11}$, and as the counterpart cavities come successively into registering positions they subject the material to powerful compression which results in forming a stream of egg-shaped blocks of great hardness and tenacity. These fall upon a take-off carrier $N^2$ or upon a chute $N^3$, which guides them to said carrier. Inasmuch as the peripheral edges of the cavities $n^{11}$ are reduced to the thinnest that is possible, there is relatively little material which passes as surplus or scrap between the rolls, the thinness of the edges between the cavities insuring that nearly all of the material shall be received in the cavities and compressed into the blocks or eggettes. The minor amount of scrap or surplus unpressed material also drops upon the chute $N^3$ and escapes through the passage at $N^4$ downward to the carrier $N^5$ which conveys it backward while the carrier at $N^2$ is conveying the eggettes outward to the bins or storing chambers at $N^6$.

In order that the blocks or eggettes, which are heated to a high degree of temperature while they are being passed through the various steps in the operation, may be sufficiently cooled by the time they are deposited by the carrier $N^2$ into the bin or receptacle $N^6$, I direct streams of cold air against them after they leave the forming rolls, and while they are being elevated by the said carrier $N^2$. For this purpose I employ a trunk or pipe $N^7$, through which the cold air is forced by the fan $N^8$, it being connected therewith by a duct $N^{13}$. One end of said pipe $N^7$ has a nozzle $N^9$ which directs the air against the eggettes or the upper part of carrier $N^2$. On the other end, the said pipe has two nozzles, one, $N^{11}$, of which directs the stream of cold air against the lower portion of said carrier, while the other nozzle $N^{12}$ forces the air up against the eggette forming rolls and keeps them at a reduced temperature. The stream of air which is forced out of nozzle $N^{12}$, serves to separate the scrap or surplus material which drops from the interstices between the cavities $n^{11}$, from the eggettes, and blows it toward the conveyer $N^5$.

I am aware of the fact that it has been proposed to deliver a blast of air against the compressed blocks while in the cavities in the roll in order to force each one out of its cavity and I do not claim such as my invention. My arrangement is entirely different therefrom, it being for the purpose of exposing the heated blocks to the cooling action of one or more blasts of cold air for a considerable period of time so that when the blocks are at last deposited in the storage bin, they are rigid enough not to lose their shape. The air ducts and nozzle are so arranged relatively to the carrier, that as the blocks are being conveyed from the rolls they are exposed to the cooling action of the air currents until they are dropped from the carrier.

As said, the scrap or surplus material is conveyed by the carrier $N^5$ to the boot $G'$ from whence it is carried by the elevator G up the receptacle H. Thus it will be seen that there is practically no waste, all the material being finally compressed into eggettes.

The novel features in the compressing mechanism shown and described have been introduced as the result of experience in using devices of the sort shown in the Patent No. 311,341 to E. F. Loiseau. Much trouble and loss was incident to the use of rolls having the cavities arranged as shown in said patent. In that case they were placed more or less remote from each other and had intervening cylindrical surfaces. These surfaces were somewhat reduced by the forming of grooves or channels longitudinally of the roll and also around it on circular lines. In the present case the cavities are brought into the closest proximity possible, so that sharp knife-like or cutting edges are provided as is clearly shown in Figs. 13 to 16 at R. These extend practically entirely around each cavity. The small angular spaces that are left can be also recessed so as to provide similarly sharp edges as at $R'$ which are practically continuations of those above described.

I am aware that it has been proposed to construct forming rolls with radially extending cylindrical bars threaded at one end and secured in sockets in the surface of the roll, the other end being recessed to form a semispherical cavity whereby a sharp edge will extend around the cavity. I do not claim this as of my invention.

By constructing my roll in the way set forth, I avoid the serious disadvantages incident to a construction such as is described. In the first place, the roll itself is weakened by the numerous apertures extending through it into which the cylindrical bars are inserted, the latter being apt to become loose or to be unscrewed so as to destroy the cylindrical shape of the roll and thereby do great damage to it; and the interstices between the bar will soon become clogged with the material being compressed so that in a short time the spaces between the semi-spherical cavities will be flush with the edges of the latter. My roll is so formed that I attain the advantages incident to the sharp knife-like edges extending around the cavities, but the interstices being practically semi-spherical or oval will be discharged of the material at the same time that it is being discharged from the larger cavities.

I claim—

1. In a mechanism for supplying and treating coal in the manufacture of compressed fuel blocks, the combination of the following elements arranged in the series described, and substantially as set forth, namely, the conveying mechanism $A'$, B, the screening mechanism C, the reducing mechanism D, the carrying mechanism E, the heating and drying mechanism F, the receptacle H, the measure J, the binder melting tank I, the binder measure $K^4$, the mixing mechanism K, L, the tempering mechanism M, and the compressing rolls N, as set forth.

2. In a machine for treating bituminous or mineral coal slack, the combination of an initially acting screen adapted to remove the reduced or dusty mass, a grinding or reducing mechanism, means for taking the relatively smaller percentage of lumps or blocks of coal from the screening mechanism to the reducing mechanisms, means independent of the screen for commingling the material from the reducing mechanism with the fine screenings, the ultimate compressing rolls, and the following elements intermediate of the compressing rolls and the reducing and screening mechanism, namely; the heater and drier for the reduced coal, an enlarged receptacle H, a heated tank for the melted binding material, the mixing mechanism, and means for varying the temperature of the commingled materials while in the mixing mechanism, substantially as set forth.

3. The combination with the mixing mechanism having a receptacle with continuously acting agitators, means for intermittingly delivering measured charges of coal, and charges of binding material through the top of the mixing receptacle, the covers inclosing the top of said receptacle, the continuously acting compressing rolls, the continuously acting conveyer for delivering to the compressing rolls, the discharge doors for delivering rapidly the material from the mixing receptacle toward the continuously acting conveyer, and a reduced passage in the mixing receptacle supplemental to the top entrance and bottom doors, substantially as set forth.

4. In a machine for treating coal and pressing it into blocks, the combination with the continuously acting rolls having cavities for forming compressed blocks, the receptacle M for the mixed material and the continuously acting devices for feeding the said material to the rolls, of the mixing mechanism, a continuously acting conveyer for the pulverized material, the receptacle H interposed between the conveyer and the mixing mechanism, the tank I for the liquid binding material, normally stationary measures for intermittingly delivering a predetermined quantity of said materials respectively to the mixing mechanism, handles for operating said measures at will, and a door in said mixing mechanism for intermittingly discharging the material when mixed to the said receptacle M, substantially as and for the purpose set forth.

5. The combination with the mixer and the tank or holder for the melted binding material, of a measure interposed between the tank and the mixer, and a movable receptacle interposed between the measure and the mixer for initially receiving the binding material from the measure, substantially as and for the purposes set forth.

6. The combination mith the mixer, and the tank or holder for the melted binding material, of the initially receiving trough mounted in said mixer for measuring the binding material, and means outside of said mixer for rocking said trough, substantially as and for the purposes set forth.

7. The combination with the mixing chamber and the rotary agitators or mixers therein, of the measuring device J for delivering a predetermined quantity of pulverized coal to the mixer, the tank for holding the melted binder, and a measuring trough for the binder as at K⁴, substantially as set forth.

8. The combination with the tank or receiver I' to initially hold the binding material, of the heating mechanism for melting the material therein, the supplemental tank I which receives the melted material, the mixer, and the duct extending from the tank I to the mixer, substantially as set forth.

9. The combination with the cylinder I' which initially receives the binding material, of the cylinder I, and the connecting pipes I² communicating with the two cylinders at points above the bottom thereof, a duct for withdrawing the melted material from said cylinders, and means for heating them both simultaneously, substantially as set forth.

10. The combination with the cylinder I' which initially receives the binding material, the cylinder I, and the connecting pipes I² communicating with said cylinders, of the casings j' j surrounding said cylinders respectively, and means for delivering steam to said casings for heating the said cylinders, substantially as set forth.

11. The combination with the compressing mechanism of the two preliminary mixers K and L arranged to act successively upon masses or charges of fuel, and the tempering mixer M arranged transversely to the mixers K and L and delivering to the compressing mechanism, substantially as set forth.

12. The combination with the mixer provided with the rotary agitating devices, of a perforated duct therein, a fan, a pipe leading therefrom to said duct for delivering air thereto, a boiler, a pipe leading therefrom to said duct for delivering steam thereto, and cut-offs in said delivery pipes operated at will whereby either steam or air may be delivered as set forth.

13. The combination with the compressing rolls, of the elevator or carrier, and the air duct arranged to deliver cooling air to said carrier whereby the compressed blocks are exposed for a period of time to the cooling action of the air blast, substantially as set forth.

14. The combination with the mixing and heating mechanisms for the material to be compressed, compressing rolls, and the elevator or carrier below said rolls for the compressed blocks, of a fan and an air duct adapted to deliver cold air at different points along said carrier whereby the heated and compressed blocks are exposed for a period of time to the blasts of cold air, substantially as set forth.

15. In a mechanism for forming compressed balls or blocks of fuel from material containing coal dust and melted or plastic hydrocarbon normally solid, the combination of a receptacle and a steam or hot air pipe for heating the mingled mass of solid coal and hydrocarbon to bring the hydrocarbon to the proper liquid or plastic condition, the compressing rolls, and means supplemental to said rolls for artificially cooling the rolls and the heated balls or blocks, substantially as set forth.

16. In a mechanism for forming compressed balls or blocks from material having coal and a hydrocarbon mingled, the combination with a receptacle for holding the said coal and hydrocarbon, means in said receptacle for advancing and agitating said material, a perforated duct adjacent to the material for delivering a heated agent thereto through the perforations, compressing rolls arranged to receive the material while hot from said receptacle, and means supplemental to said rolls for artificially cooling said rolls and the compressed balls, substantially as set forth.

17. The combination with the compressing rolls, and the carrier for the compressed blocks, of the carrier for the scraps or waste material and means for separating said scraps or waste material from said compressed blocks whereby they may be delivered to the last said carrier, substantially as set forth.

18. The combination with the compressing rolls, the carrier N², and the deflecting plate N³, of the carrier N⁵, and the mechanism for directing a blast of air across the path of the compressed blocks as they drop from the rolls, substantially as set forth.

19. The combination with the mixing mechanism, the compressing rolls, and the carrier N² for removing the compressed blocks therefrom, of carriers extending from below the crushing rolls to the mixing mechanism for redelivering the scraps or waste material from the rolls thereto, substantially as set forth.

In testimony whereof I affix my signature in presence of two witnesses.

MAX NIRDLINGER.

Witnesses:
H. H. BLISS,
ARZELA M. BAYLESS.